(12) United States Patent
Iwasaki (10) Patent No.: US 11,394,051 B2
(45) Date of Patent: Jul. 19, 2022

(54) SOLID ELECTROLYTE, ALL SOLID STATE BATTERY, AND METHOD FOR PRODUCING SOLID ELECTROLYTE

(71) Applicant: TOYOTA JIDOSHA KABUSHIKI KAISHA, Toyota (JP)

(72) Inventor: Masahiro Iwasaki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 276 days.

(21) Appl. No.: 16/400,070

(22) Filed: May 1, 2019

(65) Prior Publication Data
US 2019/0348708 A1    Nov. 14, 2019

(30) Foreign Application Priority Data
May 14, 2018 (JP) .............................. JP2018-092957

(51) Int. Cl.
*H01M 10/0562* (2010.01)
*H01M 10/0585* (2010.01)

(52) U.S. Cl.
CPC ... *H01M 10/0562* (2013.01); *H01M 10/0585* (2013.01); *H01M 2300/0068* (2013.01)

(58) Field of Classification Search
CPC ......... H01M 10/0562; H01M 10/0585; H01M 10/052; C01B 25/14; C01B 17/22
See application file for complete search history.

(56) References Cited

U.S. PATENT DOCUMENTS

| | | | |
|---|---|---|---|
| 9,941,514 B2 | 4/2018 | Suzuki et al. | |
| 2004/0106046 A1* | 6/2004 | Inda | H01M 10/0562 |
| | | | 29/623.5 |
| 2007/0259271 A1 | 11/2007 | Nanno et al. | |
| 2011/0065007 A1 | 3/2011 | Kamiya et al. | |
| 2012/0015234 A1 | 1/2012 | Iwaya et al. | |
| 2012/0237834 A1* | 9/2012 | Ogasa | H01M 10/0525 |
| | | | 429/320 |
| 2014/0302382 A1 | 10/2014 | Kambara et al. | |
| 2015/0380763 A1* | 12/2015 | Ohtomo | H01M 10/0585 |
| | | | 429/304 |
| 2016/0133989 A1* | 5/2016 | Suzuki | C03C 3/323 |
| | | | 429/323 |
| 2016/0190637 A1 | 6/2016 | Sugiura et al. | |

(Continued)

FOREIGN PATENT DOCUMENTS

| CN | 105324821 A | 2/2016 |
|---|---|---|
| CN | 102246335 B | 4/2016 |

(Continued)

OTHER PUBLICATIONS

20190049844,Written_Decision_on_Registration_(Translated), dated Jan. 14, 2021 (Year: 2021).*

*Primary Examiner* — Alexander Usyatinsky
(74) *Attorney, Agent, or Firm* — Oliff PLC (57) ABSTRACT

A main object of the present disclosure is to provide a solid electrolyte with excellent ion conductivity. The present disclosure achieves the object by providing a solid electrolyte comprising: a Li element, a P element, a S element, a Br element, and an I element; and crystal phase A having a peak at a position of $2\theta=20.2°\pm0.5°$, $23.6°\pm0.5°$ in an X-ray diffraction measurement using a CuKα ray; wherein a crystallite size of the crystal phase A is 16.0 nm or more.

8 Claims, 3 Drawing Sheets

(56) References Cited

U.S. PATENT DOCUMENTS

2016/0380305 A1* 12/2016 Doi .................... H01M 10/052
                                                      429/322
2017/0077548 A1   3/2017 Omori et al.
2017/0317334 A1* 11/2017 Yura ................. H01M 10/0562

FOREIGN PATENT DOCUMENTS

| EP | 3 113 252 A1 | 1/2017 |
| JP | 2011-060649 A | 3/2011 |
| JP | 2014-102987 A | 6/2014 |
| JP | 2014-127389 A | 7/2014 |
| JP | 2015-008073 A | 1/2015 |
| JP | 2015-011898 A | 1/2015 |
| JP | 2015-050042 A | 3/2015 |
| JP | 6234665 B2 | 11/2017 |
| KR | 10-0883044 B1 | 2/2009 |
| KR | 101197199 B1 | 11/2012 |
| KR | 101739218 B1 | 5/2017 |

* cited by examiner

SOLID ELECTROLYTE, ALL SOLID STATE BATTERY, AND METHOD FOR PRODUCING SOLID ELECTROLYTE

TECHNICAL FIELD

The present disclosure relates to a solid electrolyte with excellent ion conductivity.

BACKGROUND ART

An all solid state battery is a battery including a solid electrolyte layer between a cathode layer and an anode layer, and one of the advantages thereof is that the simplification of a safety device may be more easily achieved compared to a liquid-based battery including a liquid electrolyte containing a flammable organic solvent. As the solid electrolyte used in the solid electrolyte layer, an inorganic solid electrolyte such as a sulfide solid electrolyte and an oxide solid electrolyte has been known.

For example, Patent Literature 1 discloses a method for producing a sulfide solid electrolyte material having a peak at a position of $2\theta=20.2°$ and $23.6°$ in an X-ray diffraction measurement using a CuKα ray, the method for producing the sulfide solid electrolyte material using a raw material composition containing at least $Li_2S$, $P_2S_5$, LiI, and LiBr.

Meanwhile, Patent Literature 2 discloses a method for producing a sulfide solid electrolyte material wherein a raw material composition containing a Li element, a P element, and a S element is amorphized and thereafter heat treated in specific conditions. Patent Literature 3 discloses a method for producing a sulfide solid electrolyte comprising a crystallization step of heat treating a sulfide solid electrolyte in an environment where an atmosphere concentration of an oxygen-containing organic compound is 100 ppm or less. Patent Literature 4 discloses a method for producing a sulfide solid electrolyte wherein a rough particle material of a sulfide solid electrolyte containing halogen is synthesized, atomized, and crystallized.

Also, Patent Literature 5 discloses a method for producing an electrode active material layer containing an electrode active material, and a sulfide solid electrolyte material fused to the surface of the electrode active material and not substantially including a cross-linking sulfur. Patent Literature 6 discloses a method for producing an all solid state battery, the method comprising steps of an anode electrode body producing step, a cathode electrode body producing step, a layering step, and a connecting step.

CITATION LIST

Patent Literatures

Patent Literature 1: Japanese Patent Application Laid-Open (JP-A) No. 2015-011898
Patent Literature 2: JP-A No. 2014-127389
Patent Literature 3: JP-A No. 2015-050042
Patent Literature 4: JP-A No. 2014-102987
Patent Literature 5: JP-A No. 2011-060649
Patent Literature 6: JP-A No. 2015-008073

SUMMARY OF DISCLOSURE

Technical Problem

The battery characteristics of an all solid state battery are greatly affected by the ion conductivity of the solid electrolyte. Accordingly, a solid electrolyte with excellent ion conductivity has been demanded. The present disclosure has been made in view of the above circumstances and a main object thereof is to provide a solid electrolyte with excellent ion conductivity.

Solution to Problem

The present disclosure provides a solid electrolyte comprising: a Li element, a P element, a S element, a Br element, and an I element; and crystal phase A having a peak at a position of $2\theta=20.2°\pm0.5°$, $23.6°\pm0.5°$ in an X-ray diffraction measurement using a CuKα ray; wherein a crystallite size of the crystal phase A is 16.0 nm or more.

According to the present disclosure, the crystallite size of the crystal phase A, which is a high ion conducting phase, is large, so as to allow the solid electrolyte to have excellent ion conductivity.

In the disclosure, the crystallite size may be 22.4 nm or less.

The present disclosure also provides a solid electrolyte comprising: a Li element, a P element, a S element, a Br element, and an I element; and crystal phase A having a peak at a position of $2\theta=20.2°\pm0.5°$, $23.6°\pm0.5°$ in an X-ray diffraction measurement using a CuKα ray; wherein when intensity of a peak at $2\theta=6.42°\pm0.30°$ corresponding to a peak of the crystal phase A in an X-ray diffraction measurement using a synchrotron radiation with a wavelength of 0.4955 Å is regarded as $I_{6.42}$, and intensity of a peak at $2\theta=11.48°\pm0.30°$ corresponding to a peak of ZnO, a standard internal substance, is regarded as $I_{11.48}$, a proportion of the $I_{6.42}$ to the $I_{11.48}$ ($I_{6.42}/I_{11.48}$) is 0.1009 or more.

According to the present disclosure, the proportion of the crystal phase A which is a high ion conducting phase is much so as to allow the solid electrolyte to have excellent ion conductivity.

In the disclosure, the $I_{6.42}/I_{11.48}$ may be 0.1762 or less.

The present disclosure also provides an all solid state battery comprising a cathode active material layer containing a cathode active material, an anode active material layer containing an anode active material, and a solid electrolyte layer formed between the cathode active material layer and the anode active material layer; wherein at least one of the cathode active material layer, the anode active material layer, and the solid electrolyte layer contains the above described solid electrolyte.

According to the present disclosure, usage of the above described solid electrolyte allows the all solid state battery to have excellent output properties.

The present disclosure also provides a method for producing a solid electrolyte, the method comprising steps of: a pasting step of pasting slurry containing an amorphous solid electrolyte and a dispersion medium to form a solid electrolyte film; and a heat treating step of heat treating the solid electrolyte film at a temperature rising speed of 46.1° C./second or more to crystallize the amorphous solid electrolyte.

According to the present disclosure, the amorphous solid electrolyte is crystallized at a high temperature rising speed, and thus the solid electrolyte with excellent ion conductivity may be obtained.

In the disclosure, the amorphous solid electrolyte may contain a Li element, a P element, a S element, a Br element, and an I element; and the solid electrolyte may comprise crystal phase A having a peak at a position of $2\theta=20.2°\pm0.5°$, $23.6°\pm0.5°$ in an X-ray diffraction measurement using a CuKα ray.

In the disclosure, the heat treating step may be conducted using a heat medium having a temperature of 220° C. or more.

In the disclosure, a thickness of the solid electrolyte film may be 600 μm or less.

The disclosure may further comprise a cooling step of cooling the solid electrolyte film using a cool medium after the heat treating step.

The disclosure may further comprise a crushing step of crushing the solid electrolyte film after the heat treating step.

Advantageous Effects of Disclosure

The solid electrolyte in the present disclosure exhibits effects of excellent ion conductivity.

DESCRIPTION OF EMBODIMENTS

The solid electrolyte, the all solid state battery, and the method for producing the solid electrolyte in the present disclosure are hereinafter explained in details.

A. Solid Electrolyte

It is preferable that the solid electrolyte in the present disclosure comprises a Li element, a P element, a S element, a Br element, and an I element; and crystal phase A having a peak at a position of 2θ=20.2°±0.5°, 23.6°±0.5° in an X-ray diffraction measurement using a CuKα ray.

In addition, it is preferable that the crystallite size of the crystal phase A in the solid electrolyte in the present disclosure is the specific value or more. In this case, the crystallite size of the crystal phase A, which is a high ion conducting phase, is large, and thus the solid electrolyte may have excellent ion conductivity.

Also, in the solid electrolyte in the present disclosure, it is preferable that when intensity of a peak at 2θ=6.42°±0.30° corresponding to a peak of the crystal phase A in an X-ray diffraction measurement using a synchrotron radiation with a wavelength of 0.4955 Å is regarded as $I_{6.42}$, and intensity of a peak at 2θ=11.48°±0.30° corresponding to a peak of ZnO, a standard internal substance, is regarded as $I_{11.48}$, a proportion of the $I_{6.42}$ to the $I_{11.48}$ ($I_{6.42}/I_{11.48}$) is the specific value or more. In this case, the proportion of the crystal phase A which is a high ion conducting phase is much, and thus the solid electrolyte may have excellent ion conductivity.

Here, Patent Literature 1 discloses that $Li_2S$—$P_2S_5$—LiI—LiBr-based sulfide glass is heat treated for three hours at the temperature of 195° C. or more and 205° C. or less. The crystal phase A may be deposited by adopting such a heat treating condition; however, the heat treating time tends to be long. On the other hand, if the heat treating temperature is raised to shorten the heat treating time, later described crystal phase B is easily deposited but not the crystal phase A; it is difficult to obtain a solid electrolyte with high ion conductivity. Incidentally, if the heat treating temperature is lowered (such as to 180° C. or less), the crystal phase growth of the crystal phase A would not sufficiently proceed.

To solve the problem, in the present disclosure, as described later, a solid electrolyte in a film shape is heat treated at the temperature rising speed higher than the conventional temperature so as to uniformly apply heat to the solid electrolyte. Accordingly, the crystal phase growth of the crystal phase A may proceed while inhibiting the deposition of the crystal phase B. As the result, the crystallite size of the crystal phase A may become large. In the same manner, the proportion of the crystal phase A may be increased (the level of crystallization may be improved). Thus, the solid electrolyte in the present disclosure has an advantage of excellent ion conductivity.

The solid electrolyte in the present disclosure preferably contains a Li element, a P element, a S element, a Br element, and an I element. The proportion of the total of the Li element, the P element, the S element, the Br element, and the I element among all the elements included in the solid electrolyte is, for example, 70 mol % or more, may be 80 mol % or more, and may be 90 mol % or more.

The solid electrolyte in the present disclosure comprises crystal phase A having a peak at a position of 2θ=20.2°, 23.6° in an X-ray diffraction measurement using a CuKα ray. The crystal phase A falls under a high ion conducting phase. The crystal phase A usually has peaks at the position of 2θ=29.4°, 37.8°, 41.1°, and 47.0° other than the above described peaks. Each of these peak positions may be shifted in the range of ±0.5°, may be shifted in the range of ±0.3°, and may be shifted in the range of ±0.1°. Also, it is preferable that the solid electrolyte has only the peaks of the crystal phase A, that is, to have the crystal phase A as a single phase. The reason therefor is to allow the solid electrolyte to have high ion conductivity.

Also, it is preferable that the solid electrolyte in the present disclosure does not comprise crystal phase B having a peak at the position of 2θ=21.0°, 28.0° in an X-ray diffraction measurement using a CuKα ray. The crystal phase B falls under a low ion conducting phase of which ion conductivity is lower than that of the crystal phase A. The crystal phase B usually has peaks at the position of 2θ=32.0°, 33.4°, 38.7°, 42.8°, and 44.2° other than the above described peaks. Each of these peak positions may be shifted in the range of ±0.5°, may be shifted in the range of ±0.3°, and may be shifted in the range of ±0.1°.

Here, when the intensity of the peak at 2θ=20.2°±0.5° (peak of crystal phase A) is regarded as $I_{20.2}$ and the intensity of the peak at 2θ=21.0°±0.5° (peak of crystal phase B) is regarded as $I_{21.0}$, the proportion of $I_{21.0}$ to $I_{20.2}$ ($I_{21.0}/I_{20.2}$) is, for example, 0.4 or less, may be 0.2 or less, and may be 0.1 or less.

Also, it is preferable that the crystallite size of the crystal phase A is large. The crystallite size of the crystal phase A is, for example, 16.0 nm or more, may be 16.3 nm or more, and may be 17.0 nm or more. Meanwhile, the crystallite size of the crystal phase A is, for example, 30.0 nm or less, and may be 22.4 nm or less. The crystallite size of the crystal phase A can be calculated from the formula of Scherrer as described in Examples later.

Also, the crystal phase A usually has peaks at the positions of 2θ=6.42°, 7.54°, 9.14°, and 9.35° in an X-ray diffraction measurement using a synchrotron radiation with a wavelength of 0.4955 Å. Each of these peak positions may be shifted in the range of ±0.50°, may be shifted in the range of ±0.30°, and may be shifted in the range of ±0.10°. On the other hand, the crystal phase B usually has peaks at the positions of 2θ=5.50°, 8.61°, 10.35°, and 14.09° in an X-ray diffraction measurement using a synchrotron radiation with a wavelength of 0.4955 Å. Each of these peak positions may be shifted in the range of ±0.50°, may be shifted in the range of ±0.30°, and may be shifted in the range of ±0.10°.

Here, when the intensity of the peak at 2θ=6.42°±0.50° (peak of crystal phase A) is regarded as $I_{6.42}$ and the intensity of the peak at 2θ=5.50°±0.50° (peak of crystal phase B) is regarded as $I_{5.50}$, the proportion of $I_{5.50}$ to $I_{6.42}$ ($I_{5.50}/I_{6.42}$) is, for example, 0.1 or less, may be 0.05 or less, and may be 0.01 or less.

Also, when ZnO is used as a standard internal substance, a peak at 2θ=11.48°±0.30° is obtained as the peak of ZnO. The intensity of this peak is regarded as $I_{11.48}$. The proportion of $I_{6.42}$ to $I_{11.48}$ ($I_{6.42}/I_{11.48}$) is, for example, 0.1009 or more, and preferably 0.1100 or more. Meanwhile, $I_{6.42}/I_{11.48}$ is, for example, 0.2000 or less, and may be 0.1762 or less.

It is preferable that the solid electrolyte in the present disclosure comprises an ion conductor containing a Li element, a P element, and a S element; and LiI and LiBr. At least a part of LiI and LiBr is preferably present in the state taken into the structure of the ion conductor as a LiI component and a LiBr component respectively. The ion conductor preferably has $PS_4^{3-}$ structure as an anion structure. Also, the proportion of the $PS_4^{3-}$ structure to all the anion structures included in the ion conductor is, for example, 50 weight % or more, may be 70 weight % or more, and may be 90 weight % or more. The proportion of $PS_4^{3-}$ structure may be determined by a method such as a Raman spectroscopy, NMR, and XPS.

The solid electrolyte in the present disclosure preferably has a composition represented by, for example, $aLiI-bLiBr-cLi_3PS_4$ (a+b+c=100), in which "a" is, for example, 1 or more, may be 5 or more, and may be 10 or more. Meanwhile, "a" is, for example, 30 or less and may be 20 or less. Also, "b" is, for example, 1 or more, may be 5 or more, and may be 10 or more. Meanwhile, "b" is, for example, 30 or less and may be 20 or less. Also, "c" is, for example, 40 or more, and may be 50 or more. Meanwhile, "c" is, for example, 90 or less, and may be 70 or less.

The solid electrolyte in the present disclosure is preferably a sulfide solid electrolyte. Also, the solid electrolyte in the present disclosure is preferably glass ceramic. The glass ceramic signifies a material which is crystallized glass. Whether the material is glass ceramic or not can be confirmed by, for example, an X-ray diffraction measurement. Also, glass signifies a material synthesized by amorphizing a raw material composition; it signifies not only "glass" in strict sense in which periodicity as crystal is not observed in a measurement such as an X-ray diffraction measurement, but also signifies a material in general synthesized by amorphizing the material using a method such as later described mechanical milling. Accordingly, even when a peak derived from, for example, a raw material (such as Li and LiBr) is observed in a measurement such as an X-ray diffraction measurement, if it is a material synthesized by amorphization, it falls under glass.

Examples of the shape of the solid electrolyte in the present disclosure may include a film shape and a granular shape. The average particle size ($D_{50}$) of the solid electrolyte in a granular shape is, for example, 0.1 μm or more and 50 μm or less. Also, the solid electrolyte preferably has high ion conductivity. The Li ion conductivity at 25° C. is, for example, $1.0*10^{-3}$ S/cm or more, may be $3.0*10^{-3}$ S/cm or more, and may be $3.3*10^{-3}$ S/cm or more.

B. All Solid State Battery

Figure 1:
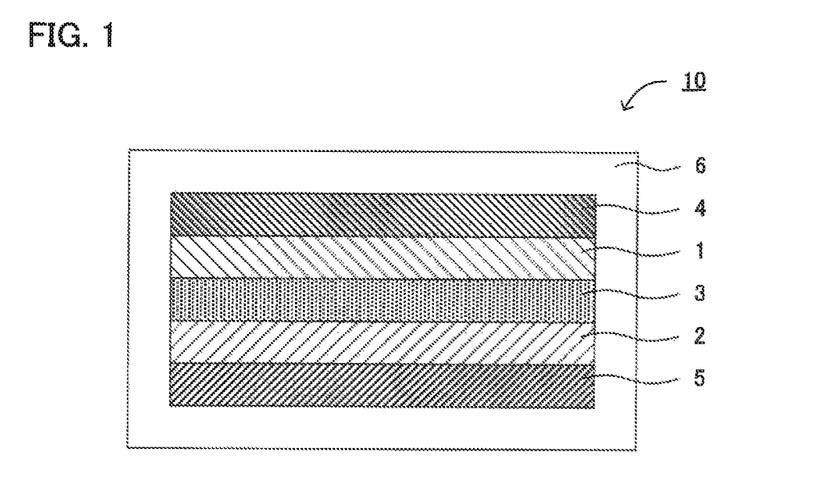
FIG. 1 is a schematic cross-sectional view illustrating an example of the all solid state battery in the present disclosure.

FIG. 1 is a schematic cross-sectional view illustrating an example of the all solid state battery in the present disclosure. All solid state battery 10 illustrated in FIG. 1 has cathode active material layer 1 containing a cathode active material, anode active material layer 2 containing an anode active material, solid electrolyte layer 3 formed between cathode active material layer 1 and anode active material layer 2, cathode current collector 4 for collecting currents of cathode active material layer 1, anode current collector 5 for collecting currents of anode active material layer 2, and battery case 6 for storing these members. One of the features of the present disclosure is that at least one of cathode active material layer 1, anode active material layer 2, and solid electrolyte layer 3 contains the above described solid electrolyte.

According to the present disclosure, usage of the above described solid electrolyte allows an all solid state battery to have excellent output properties.

1. Cathode Active Material Layer

The cathode active material layer is a layer containing at least a cathode active material, and may further contain at least one of a solid electrolyte, a conductive material, and a binder, as required. In particular, in the present disclosure, it is preferable that the cathode active material layer contains the above described solid electrolyte. The proportion of the solid electrolyte included in the cathode active material layer is, for example, 0.1 volume % or more, may be 1 volume % or more, and may be 10 volume % or more. Meanwhile, the proportion of the solid electrolyte included in the cathode active material layer is, for example, 80 volume % or less, may be 60 volume % or less, and may be 50 volume % or less.

Examples of the cathode active material may include an oxide active material such as $LiCoO_2$, $LiMnO_2$, $Li_2NiMn_3O_8$, $LiVO_2$, $LiCrO_2$, $LiFePO_4$, $LiCoPO_4$, $LiNiO_2$, and $LiNi_{1/3}Co_{1/3}Mn_{1/3}O_2$. Also, sulfur (S) may be used as the cathode active material. Also, a coating layer containing a Li ion conductive oxide may be formed on the surface of the cathode active material. The reason therefor is to inhibit the reaction of the cathode active material with the solid electrolyte. Examples of the Li ion conductive oxide may include $LiNbO_3$, $Li_4Ti_5O_{12}$, and $Li_3PO_4$.

The cathode active material layer may contain a conductive material. Addition of the conductive material may improve the conductivity in the cathode active material layer. Examples of the conductive material may include a carbon material such as acetylene black, Ketjen black, and carbon fiber. Also, the cathode active material layer may contain a binder. Examples of the binder may include a fluorine-based binder such as polyvinylidene fluoride (PVDF). Also, the thickness of the cathode active material layer is, for example, 0.1 μm or more and 1000 μm or less.

2. Anode Active Material Layer

The anode active material layer is a layer containing at least an anode active material, and may further contain at least one of a solid electrolyte, a conductive material, and a binder, as required. In particular, in the present disclosure, it is preferable that the anode active material layer contains the above described solid electrolyte. The proportion of the solid electrolyte included in the anode active material layer is, for example, 0.1 volume % or more, may be 1 volume % or more, and may be 10 volume % or more. Meanwhile, the proportion of the solid electrolyte included in the anode active material layer is, for example, 80 volume % or less, may be 60 volume % or less, and may be 50 volume % or less.

Examples of the anode active material may include a metal active material and a carbon active material. Examples of the metal active material may include Li, In, Al, Si, and Sn. On the other hand, examples of the carbon active material may include mesocarbon microbeads (MCMB), highly oriented pyrolytic graphite (HOPG), hard carbon, and soft carbon. Incidentally, the conductive material and the binder to be used in the anode active material layer are the same as those in the cathode active material layer described above. Also, the thickness of the anode active material layer is, for example, 0.1 µm or more and 1000 µm or less.

3. Solid Electrolyte Layer

The solid electrolyte layer is a layer formed between the cathode active material layer and the anode active material layer. Also, the solid electrolyte layer is a layer containing at least a solid electrolyte, and may further contain a binder as required. In particular, in the present disclosure, it is preferable that the solid electrolyte layer contains the above described solid electrolyte. The proportion of the solid electrolyte included in the solid electrolyte layer is, for example, 50 volume % or more, may be 70 volume % or more, and may be 90 volume % or more. Incidentally, the binder to be used in the solid electrolyte layer is the same as in the cathode active material layer described above. Also, the thickness of the solid electrolyte layer is, for example, 0.1 µm or more and 1000 µm or less.

4. Other Constitutions

The all solid state battery in the present disclosure has at least the above described cathode active material layer, solid electrolyte layer, and anode active material layer, and usually further includes a cathode current collector for collecting currents of the cathode active material layer and an anode current collector for collecting currents of the anode active material layer. Examples of the material for the cathode current collector may include SUS, aluminum, nickel, iron, titanium, and carbon. On the other hand, examples of the material for the anode current collector may include SUS, copper, nickel, and carbon.

5. All Solid State Battery

The all solid state battery in the present disclosure is preferably an all solid lithium ion battery. Also, the all solid state battery may be a primary battery and may be a secondary batter, but the latter is preferable so as to be repeatedly charged and discharged and be useful as a car-mounted battery, for example.

C. Method for Producing Solid Electrolyte

Figure 2A:
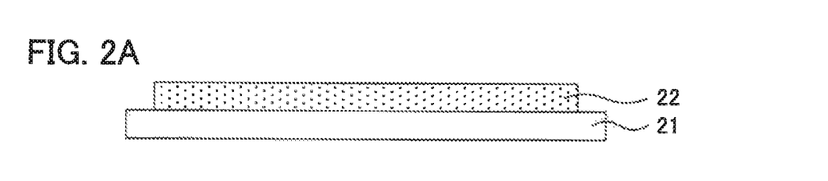
FIGS. 2A to 2C are schematic cross-sectional views illustrating an example of the method for producing the solid electrolyte in the present disclosure.
Figure 2B:
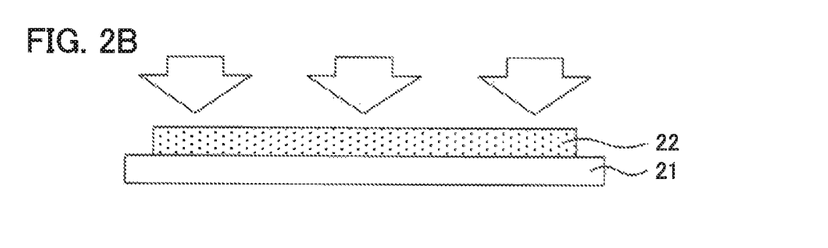
Figure 2C:
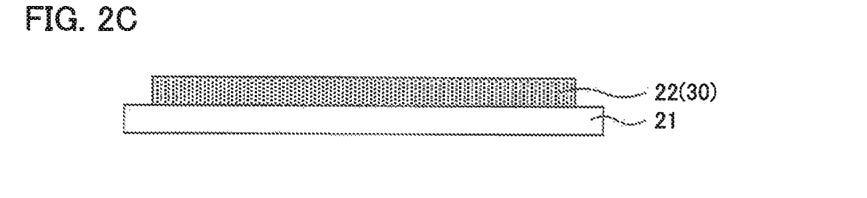

FIGS. 2A to 2C are schematic cross-sectional views illustrating an example of the method for producing the solid electrolyte in the present disclosure. In FIGS. 2A to 2C, slurry containing an amorphous solid electrolyte and a dispersion medium is pasted on substrate 21 to form solid electrolyte film 22 (FIG. 2A, pasting step). Next, solid electrolyte film 22 is heat treated at a temperature rising speed in a specific value or more to crystallize an amorphous solid electrolyte (not illustrated) (FIG. 2B, heat treating step). Thereby, solid electrolyte 30 is obtained (FIG. 2C). Solid electrolyte 30 may be, as illustrated in FIG. 2C, in a film shape (layer shape). In this case, the solid electrolyte in a film shape (layer shape) may be used as, for example, a solid electrolyte layer in an all solid state battery. Meanwhile, solid electrolyte 30 may be in a powder shape. The solid electrolyte in a powder shape may be obtained by, for example, crushing solid electrolyte film 22.

According to the present disclosure, the amorphous solid electrolyte is crystallized at a high temperature rising speed, and thus the solid electrolyte with excellent ion conductivity may be obtained.

1. Pasting Step

The pasting step in the present disclosure is a step of pasting slurry containing an amorphous solid electrolyte and a dispersion medium to form a solid electrolyte film. The solid electrolyte film is preferably dried after pasting the slurry. Meanwhile, after pasting the slurry, later described heat treating step may be conducted but not drying.

The slurry contains an amorphous solid electrolyte and a dispersion medium. The "amorphous solid electrolyte" signifies a solid electrolyte of which crystallinity improves even in some extent. It means that, the amorphous solid electrolyte is a material that has at least an amorphous phase. In other words, the amorphous solid electrolyte may be a material that has only the amorphous phase, and may be a material that further has a crystal phase in addition to the amorphous phase. Also, in the amorphous solid electrolyte, a halo pattern may be observed and may not be observed in an XRD measurement. It can be said that the non-crystallinity of the former is higher than the latter. Also, the amorphous solid electrolyte may have a crystal phase derived from a raw material (such as $GeS_2$).

Examples of the amorphous solid electrolyte may include an amorphous sulfide solid electrolyte, an amorphous oxide solid electrolyte, an amorphous nitride solid electrolyte, and an amorphous halide solid electrolyte. The amorphous sulfide solid electrolyte preferably contains a Li element, an M element (M is preferably at least one kind of P, Ge, Si, Sn, B, and Al), and a S element. The amorphous sulfide solid electrolyte may further contain a halogen element. Examples of the halogen element may include a F element, a Cl element, a Br element, and an I element. Also, the amorphous sulfide solid electrolyte may further contain an O element.

Examples of the amorphous sulfide solid electrolyte may include $Li_2S$—$P_2S_5$, $Li_2S$—$P_2S_5$—$LiI$, $Li_2S$—$P_2S_5$—$GeS_2$, $Li_2S$—$P_2S_5$—$Li_2O$, $Li_2S$—$P_2S_5$—$Li_2O$—$LiI$, $Li_2S$—$P_2S_5$—$LiI$—$LiBr$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (provided that m and n is a real number; Z is either one of Ge, Zn, and Ga), $Li_2S$—$GeS_2$, $Li_2S$—$SiS_2$—$Li_3PO_4$, and $Li_2S$—$SiS_2$-$Li_xMO_y$ (provided that x and y is a real number; M is either one of P, Si, Ge, B, Al, Ga, and In).

The amorphous sulfide solid electrolyte may be obtained by, for example, amorphizing a raw material composition containing constituent elements of the amorphous sulfide solid electrolyte. The raw material composition preferably contains, for example, $Li_2S$, $P_2S_5$, $LiI$, and $LiBr$. Examples of the method for amorphizing the raw material composition may include mechanical milling and a melt and quenching method. Examples of mechanical milling may include ball milling, vibration milling, turbo milling, mechano-fusion milling, and disc milling.

On the other hand, the amorphous oxide solid electrolyte preferably contains a Li element, an M element (M is preferably at least one kind of P, Ge, Si, Sn, B, and Al), and an O element. The amorphous oxide solid electrolyte may further contain a halogen element. Examples of the halogen element may include a F element, a Cl element, a Br element, and an I element. The amorphous oxide solid electrolyte may further contain a nitrogen element.

Examples of the amorphous oxide solid electrolyte may include $Li_2O$—$B_2O_3$—$P_2O_5$, $Li_2O$—$SiO_2$, $Li_2O$—$B_2O_3$, and $Li_2O$—$B_2O_3$—$ZnO$. Also, as the amorphous oxide solid electrolyte, for example, $Li_{1.3}Al_{0.3}Ti_{0.7}(PO_4)_3$, $Li_5La_3Ta_2O_{12}$, $Li_7La_3Zr_2O_{12}$, $Li_6BaLa_2Ta_2O_{12}$, $Li_{3.6}Si_{0.6}P_{0.4}O_4$, $Li_4SiO_4$, $Li_3PO_4$, and $Li_3PO_{4-3/2x}N_x$ ($x \leq 1$), may be used. Examples of the amorphous nitride solid electrolyte may include $Li_3N$ and $Li_3N$—LiI—LiOH. Examples of the amorphous halide slid electrolyte may include LiF, LiCl, LiBr, LiI, and LiI—$Al_2O_3$.

There are no particular limitations on the dispersion medium used in the slurry, and it may be appropriately selected according to the kind of the amorphous solid electrolyte. Examples of the method for producing the slurry may include a method of kneading the amorphous solid electrolyte and the dispersion medium. Examples of the method for kneading may include means such as an ultrasonic homogenizer, a shaker, a thin film orbiting type mixer, a dissolver, a homo-mixer, a kneader, a roll-mill, a sand-mill, an attritor, a ball-mill, a vibrator-mill, and a high-speed-impeller-mill. Examples of the method for pasting the slurry may include a doctor blading method, a die coating method, a gravure coating method, a spray coating method, a static coating method, and a bar coating method.

There are no particular limitations on the thickness of the solid electrolyte film; for example, the thickness is 600 μm or less, may be 300 μm or less, may be 100 μm or less, may be 30 μm or less, and may be 10 μm or less. Meanwhile, the thickness of the solid electrolyte film is, for example, 0.5 μm or more. The solid electrolyte film may contain only the solid electrolyte, and may further contain an additional solid component.

2. Heat Treating Step

The heat treating step in the present disclosure is a step of heat treating the solid electrolyte film at the temperature rising speed in the specific value or more to crystallize the amorphous solid electrolyte.

The temperature rising speed in the present disclosure signifies the temperature rising speed in the vicinity of the temperature at which the crystallization of the solid electrolyte starts. In specific, the temperature rising speed may be defined as follows. First, the temperature at which the crystallization of the solid electrolyte starts is measured by thermal analysis (DTA or DSC). The crystallization start temperature refers to temperature $T_1$ (° C.) where the incline of the Heat Flow curve becomes positive in a low temperature side of the peak generated by the crystallization. Next, in the heating profile, increased temperature from $T_1$ (° C.) to ($T_1+50$) (° C.) is divided by the time from $T_1$ (° C.) to ($T_1+50$) (° C.) to obtain the temperature rising speed. Incidentally, the heating profile may be obtained by, for example, measuring the temperature on the surface of the solid electrolyte film with a thermocouple.

The temperature rising speed is, for example, 46.1° C./second or more, and may be 67.0° C./second or more. Meanwhile, the temperature rising speed is, for example, 150° C./second or less, and may be 124.6° C./second or less.

In the present disclosure, it is preferable tat the temperature of 220° C. or more is applied to the solid electrolyte film. The temperature may be 240° C. or more, may be 260° C. or more, and may be 280° C. or more. Meanwhile, the temperature is, for example, 400° C. or less. Also, there are no particular limitations on the heat treating time; the time is, for example, 2.5 seconds or more, may be 5 seconds or more, and may be 7.5 seconds or more. Meanwhile, the heat treating time is, for example, 60 seconds or less, may be 45 seconds or less, may be 30 seconds or less, and may be 20 seconds or less.

Figure 3:
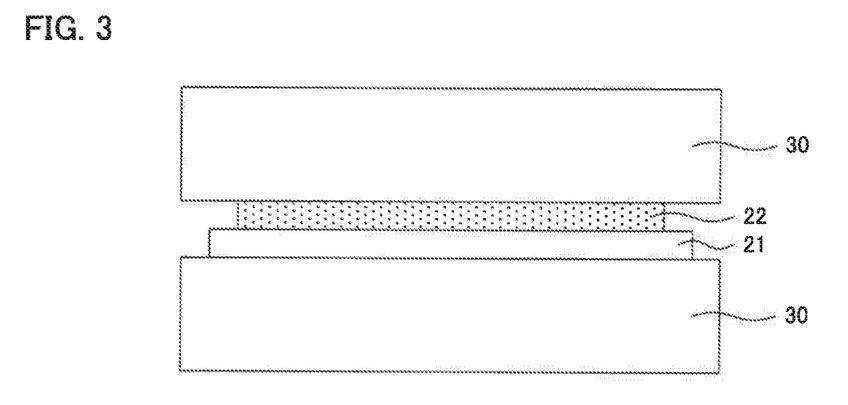
FIG. 3 is a schematic cross-sectional view explaining the heat treating step in the present disclosure.

In the present disclosure, the heat treating is preferably conducted using a heated heat medium. Examples of the heat medium may include a metal block such as a SUS block. For example, as illustrated in FIG. 3, solid electrolyte film 22 may be heat treated by bringing heated heat medium 30 into contact with solid electrolyte film 22. In FIG. 3, solid electrolyte film 22 is heat treated from the both surfaces; however, solid electrolyte film 22 may be heat treated from just one surface thereof. Also, in FIG. 3, heat medium 30 is directly brought into contact with solid electrolyte film 22, but it may be brought into contact indirectly. Also, solid electrolyte film 22 may be heat treated by disposing heat medium 30 near solid electrolyte film 22.

Also, the solid electrolyte film may be heat treated by, for example, hot-pressing such as hot-roll-pressing and hot-flat-plate-pressing. In this case, a roll in hot-roll-pressing and a flat plate in hot-flat-plate-pressing respectively falls under the heat medium. Also, there are no particular limitations on the atmosphere for the heat treatment, but decompressed atmosphere or gas-flow atmosphere is preferable. The reason therefor is to easily remove gas generated from the solid electrolyte.

3. Cooling Step

In the present disclosure, a cooling step of cooling the solid electrolyte film using a cool medium may be conducted after the heat treating step. Conduction of the cooling step inhibits the deposition of the above described crystal phase B, for example. There are no particular limitations on the temperature of the cool medium if it is lower than the temperature of the solid electrolyte film; it may be at a room temperature, and may be 0° C. or less.

Examples of the cool medium may include a metal block such as a SUS block. Also, the solid electrolyte film may be cooled by, for example, pressing such as roll-pressing and flat-plate-pressing. In this case, a roll in roll-pressing and a flat plate in flat-plate-pressing respectively falls under the cool medium.

4. Crushing Step

In the present disclosure, a crushing step of crushing the solid electrolyte film may be conducted after the heat treating step. Incidentally, when the above described cooling step is to be conducted, the crushing step is preferably conducted after the cooling step. The solid electrolyte in a powder shape is obtained by the crushing step. There are no particular limitations on the method for crushing the solid electrolyte film, and a general crushing method may be adopted.

5. Solid Electrolyte

The solid electrolyte to be obtained by each of the above described steps is preferably a sulfide solid electrolyte. Also, the solid electrolyte in the present disclosure is preferably glass ceramic. Examples of the shape of the solid electrolyte in the present disclosure may include a film shape and a granular shape. The average particle size ($D_{50}$) of the solid electrolyte in a granular shape is, for example, 0.1 μm or more and 50 μm or less. Also, the solid electrolyte preferably has high ion conductivity, and the Li ion conductivity at 25° C. is, for example, $1.0*10^{-4}$ S/cm or more, and may be $1.0*10^{-3}$ S/cm or more. Also, in the method for producing the solid electrolyte in the present disclosure, it is preferable to obtain the solid electrolyte described in "A. Solid electrolyte" above.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Example 1

Atomizing Step

Sulfide glass (10LiI-15LiBr-37.5Li$_3$PS$_4$) of 75 g, dehydrated heptane (from Kishida Chemical Co., Ltd.) of 120 g, dehydrated n-butyl ether (from Kishida Chemical Co., Ltd.) of 80 g, and a crushing media (particle size φ0.3 mm) of 400 g were projected into a container (500 ml, ZrO$_2$) for planetary ball milling and the container was completely sealed. The sealed container was installed to a planetary ball milling machine (P5 from Fritsch Japan Co., Ltd.) to conduct planetary ball milling at the weighing table rotation number of 150 rpm for 22 hours. After that, the crushing media was separated to obtain slurry, and the slurry was dried at a hot plate set to 120° C. for 3 hours, and thereby atomized sulfide glass was obtained.

Heat Treating Step

The slurry containing the obtained sulfide glass of 0.5 g and heptane was pasted on an Al foil and dried to form a solid electrolyte film (thickness: 6 μm). Next, a SUS block heated to 220° C. was brought into contact with the solid electrolyte film for 5 seconds in the conditions of air pressure, an Ar atmosphere, and the dew point of −76° C., to crystallize the solid electrolyte included in the solid electrolyte film. After that, a SUS block at a room temperature was brought into contact with the solid electrolyte film to cool down the solid electrolyte film. The obtained solid electrolyte film was taken out from the Al foil, and thereby a solid electrolyte powder was obtained.

Examples 2 to 14

A solid electrolyte powder was obtained in the same manner as in Example 1 except that the heated temperature of the SUS block and the heat treating time were changed to the contents shown in Table 1.

Comparative Example 1

An atomized sulfide glass was obtained in the same manner as in Example 1. The obtained sulfide glass of 0.5 g was placed on a hot plate at 180° C. and heated for 1 minute in the conditions of air pressure, an Ar atmosphere, and the dew point of −76° C. to crystallize the solid electrolyte included in the solid electrolyte film. Next, the obtained solid electrolyte film was taken out to obtain a solid electrolyte powder.

Comparative Examples 2 to 8

A solid electrolyte powder was obtained in the same manner as in Example 1, except that the heated temperature of the hot plate and the heat treating time were changed to the contents shown in Table 1.

[Evaluation]

Temperature Rising Speed Measurement

The heating profiles in Examples 1 to 14 and Comparative Examples 1 to 8 were measured using a thermocouple. Also, a DTA analysis was respectively conducted for the sulfide glass used in Examples 1 to 14 and Comparative Examples 1 to 8. The temperature at which the crystallization of the sulfide glass started was approximately 150° C. Then, the temperature rising speed was respectively obtained from the increased temperature and the time in the range of 150° C. to 200° C. in the heating profiles. The results are shown in Table 1 and Table 2.

Li Ion Conductivity Measurement

Li ion conductivity was measured using the solid electrolytes obtained in Examples 1 to 14 and Comparative Examples 1 to 8. First, in a glove box with the dew point of −80° C., a sulfide solid electrolyte was weighed so as to be 200 mg to put in a cylinder made of macole and pressed at the pressure of 4 ton/cm. The both edges of the obtained pellet were pinched with a pin made of SUS, confined with a bolt to apply confining pressure to the pellet and thereby an evaluation cell was obtained. The Li ion conductivity at 25° C. of the obtained evaluation cell was measured by an alternating current impedance method. For the measurement, Solartron 1260 was used with the applying voltage of 5 mV and the measurement frequency range of 0.01 MHz to 1 MHz. The results are shown in Table 1 and Table 2.

XRD Measurement

An X-ray diffraction measurement using a CuKα ray was conducted for the solid electrolytes obtained in Examples 1 to 14 and Comparative Examples 1 to 8. As the result, it was confirmed that all the solid electrolytes obtained in Examples 1 to 14 had the crystal phase A which is a high ion conducting phase as a single phase or as a main phase. Meanwhile, in Comparative Examples 1 to 8, a solid electrolyte having the crystal phase A as a single phase or as a main phase was obtained when the heat treatment was conducted at 200° C. to 220° C.; however, the growth of the crystal phase A was insufficient when the heat treatment was conducted at less than 200° C., and the crystal phase B which is a low ion conducting phase was generated when the heat treatment was conducted at 220° C. or more.

Also, an X-ray diffraction measurement using a synchrotron radiation was conducted for the solid electrolytes obtained in Examples 2, 3, 7 to 9, 12, and Comparative Example 4. A mixture containing the solid electrolyte and a standard internal powder (ZnO) in the weight ratio of 70:30 was prepared as a measurement sample. Also, the measurement conditions were as follows:

Energy: 25 keV;
Wavelength: 0.4955 Å (after the calibration by a standard sample);
Detector: imaging plate;
Exposure time: 5 minutes;
Temperature condition: room temperature; and
Scattering angle: 2° to 77°.

Figure 4:
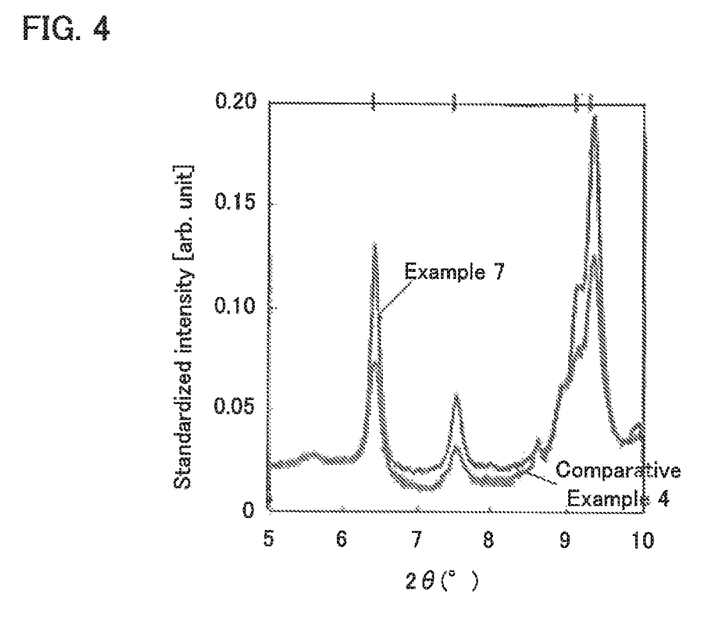
FIG. 4 is the result of an X-ray diffraction measurement using a synchrotron radiation for the solid electrolytes obtained in Example 7 and Comparative Example 4.

A representative result is shown in FIG. 4. As shown in FIG. 4, it was confirmed that the peaks at the positions of 2θ=6.42°, 7.54°, 9.14°, and 9.35° were present in Example 7 and Comparative Example 4. These peaks fall under the peaks of the crystal phase A which is a high ion conducting phase. Also, the intensity of a peak at 2θ=6.42° was regarded as $I_{6.42}$, and although not illustrated, the intensity of a peak at 2θ=11.48° (peak of ZnO) was regarded as $I_{11.48}$, and the value of $I_{6.42}/I_{11.48}$ was determined. In addition, the crystallite size was calculated from the full width at half maximum (FWHM) using the formula of Scherrer. The results are shown in Table 1 and Table 2.

$$D=K\lambda/(\beta \cos \theta)$$

K: Scherrer constant, λ: wavelength, β: expansion of diffraction line due to the size of crystallite, θ: diffraction angle 2θ/θ

TABLE 1

| | Heating temperature (° C.) | Heat treating time (s) | Temperature rising speed (° C./s) | Li ion conductivity (mS/cm) | $I_{6.42}/I_{11.48}$ | Crystallite size (nm) |
|---|---|---|---|---|---|---|
| Example 1 | 220 | 5 | 46.1 | 2.7 | — | — |
| Example 2 | 240 | 2.5 | 67.0 | 2.9 | 0.0822 | 16.0 |
| Example 3 | 240 | 5 | | 2.8 | 0.0939 | 16.3 |
| Example 4 | 240 | 10 | | 3.0 | — | — |
| Example 5 | 240 | 20 | | 3.0 | — | — |
| Example 6 | 260 | 5 | 86.2 | 3.2 | — | — |
| Example 7 | 260 | 10 | | 3.5 | 0.1174 | 19.5 |
| Example 8 | 260 | 20 | | 3.4 | 0.1009 | 17.9 |
| Example 9 | 280 | 5 | 105.4 | 3.7 | 0.1542 | 21.2 |
| Example 10 | 280 | 7.5 | | 3.9 | — | — |
| Example 11 | 280 | 10 | | 3.7 | — | — |
| Example 12 | 300 | 5 | 124.6 | 4.0 | 0.1762 | 22.4 |
| Example 13 | 300 | 7.5 | | 3.9 | — | — |
| Example 14 | 300 | 10 | | 3.6 | — | — |

TABLE 2

| | Heating temperature (° C.) | Heat treating time (s) | Temperature rising speed (° C./s) | Li ion conductivity (mS/cm) | $I_{6.42}/I_{11.48}$ | Crystallite size (nm) |
|---|---|---|---|---|---|---|
| Comparative Example 1 | 180 | 60 | 0.39 | 0.7 | — | — |
| Comparative Example 2 | 180 | 10800 | | 2.9 | — | — |
| Comparative Example 3 | 200 | 60 | | 0.9 | — | — |
| Comparative Example 4 | 200 | 10800 | | 3.2 | 0.1000 | 15.5 |
| Comparative Example 5 | 220 | 60 | | 1.3 | — | — |
| Comparative Example 6 | 220 | 10800 | | 2.1 | — | — |
| Comparative Example 7 | 240 | 60 | | 2.3 | — | — |
| Comparative Example 8 | 240 | 10800 | | 0.2 | — | — |

Figure 5:
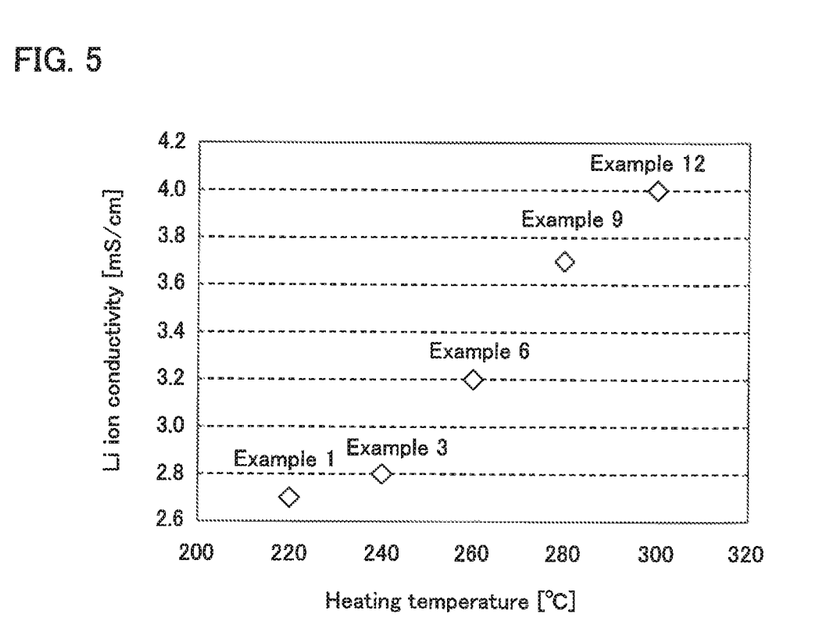
FIG. 5 is the result of a Li ion conduction measurement for the solid electrolytes obtained in Examples 1, 3, 6, 9, and 12.

As shown in Table 1 and Table 2, solid electrolytes with excellent ion conductivity were obtained in Examples 1 to 14. The reason therefor was presumed that the crystallite size of the crystal phase A and the value of $I_{6.42}/I_{11.48}$ were large in the solid electrolyte obtained in Examples 1 to 14. Also, FIG. 5 is the result for Examples 1, 3, 6, 9, and 12 (heat treating time was respectively 5 seconds). As shown in FIG. 5, improvement in Li ion conductivity was confirmed along with the increase of the heating temperature. Further, the heat treating time for Examples 1 to 14 was extremely short and the productivity was extremely superior. On the other hand, the Li ion conductivity in Comparative Examples 1 to 8 was lower than that of Examples 1 to 14 overall. Incidentally, the Li ion conductivity in Comparative Example 4 was comparatively high; however, the crystallite size was small. Also, the heat treating time for Comparative Example 4 was 3 hours, and the productivity was low.

REFERENCE SIGNS LIST 1 cathode active material layer
2 anode active material layer
3 solid electrolyte layer
4 cathode current collector
5 anode current collector
6 battery case
10 all solid state battery
21 substrate
22 solid electrolyte film
30 solid electrolyte

What is claimed is:
1. A method for producing a solid electrolyte, the solid electrolyte comprising a crystal phase A having a peak at a position of 2θ=20.2°±0.5°, 23.6°±0.5° in an X-ray diffraction measurement using a CuKα ray, the method comprising steps of:
    a forming step of forming a solid electrolyte film by pasting slurry containing an amorphous solid electrolyte and a dispersion medium on substrate, wherein the amorphous solid electrolyte contains a Li element, a P element, a S element, a Br element, and an I element; and
    a heat treating step of heat treating the solid electrolyte film at a temperature rising speed of 46.1° C./second or more to crystallize the amorphous solid electrolyte, wherein
    a temperature of 220° C. or more and 400° C. or less is applied to the solid electrolyte film in the heat treating step,
    a heat treating time of the heat treating step is 60 seconds or less and 2.5 seconds or more,
    the heat treating step is conducted using a heat medium having a temperature of 220° C. or more, and
    a thickness of the solid electrolyte film is 600 μm or less and 0.5 μm or more.

2. The method for producing a solid electrolyte according to claim 1, further comprising a cooling step of cooling the solid electrolyte film using a cool medium after the heat treating step.

3. The method for producing a solid electrolyte according to claim 1, further comprising a crushing step of crushing the solid electrolyte film after the heat treating step.

4. The method for producing a solid electrolyte according to claim 1, wherein a heat treating time of the heat treating step is 45 seconds or less and 5 seconds or more.

5. The method for producing a solid electrolyte according to claim 1, wherein a crystallite size of the crystal phase A is 16.0 nm or more.

6. The method for producing a solid electrolyte according to claim 5, wherein the crystallite size is 22.4 nm or less.

7. The method for producing a solid electrolyte according to claim 6, wherein when intensity of a peak at $2\theta=6.42°\pm0.30°$ corresponding to a peak of the crystal phase A in an X-ray diffraction measurement using a synchrotron radiation with a wavelength of 0.4955 Å is regarded as $I_{6.42}$, and intensity of a peak at $2\theta=11.48°\pm0.30°$ corresponding to a peak of ZnO, a standard internal substance, is regarded as $I_{11.48}$, a proportion of the $I_{6.42}$ to the $I_{11.48}$ ($I_{6.42}/I_{11.48}$) is 0.1009 or more.

8. The method for producing a solid electrolyte according to claim 7, wherein the $I_{6.42}/I_{11.48}$ is 0.1762 or less.

\* \* \* \* \*